(12) United States Patent
Drewlies

(10) Patent No.: US 7,798,807 B2
(45) Date of Patent: Sep. 21, 2010

(54) PLASTIC INJECTION MOULD TOOL

(75) Inventor: Klaus-Dieter Drewlies, Gladenbach (DE)

(73) Assignee: Zimmermann Formenbau GmbH, Gladenbach-Erdhausen (DE)

( * ) Notice: Subject to any disclaimer, the term of this patent is extended or adjusted under 35 U.S.C. 154(b) by 0 days.

(21) Appl. No.: 11/722,253

(22) PCT Filed: Apr. 18, 2006

(86) PCT No.: PCT/EP2006/003517

§ 371 (c)(1),
(2), (4) Date: Aug. 27, 2009

(87) PCT Pub. No.: WO2006/117068

PCT Pub. Date: Nov. 9, 2006

(65) Prior Publication Data

US 2009/0304850 A1 Dec. 10, 2009

(30) Foreign Application Priority Data

May 3, 2005 (DE) ............. 10 2005 021 011
May 4, 2005 (DE) ............. 10 2005 021 351

(51) Int. Cl.
*B29C 45/40* (2006.01)

(52) U.S. Cl. .............. 425/556; 425/441; 425/443

(58) Field of Classification Search ............ 425/436 R, 425/441, 443, 577, 556, DIG. 5, DIG. 58, 425/438, 436 RM See application file for complete search history.

(56) References Cited

U.S. PATENT DOCUMENTS

| | | | | |
|---|---|---|---|---|
| 2,948,031 A | * | 8/1960 | Webb ............ | 164/340 |
| 3,865,529 A | * | 2/1975 | Guzzo ............ | 425/556 |
| 3,986,698 A | * | 10/1976 | Darnall, Jr. ......... | 249/163 |
| 4,378,928 A | * | 4/1983 | Kopp et al. ......... | 249/63 |
| 4,627,810 A | * | 12/1986 | Von Holdt ......... | 425/577 |
| 4,731,014 A | * | 3/1988 | Von Holdt ......... | 425/556 |
| 4,832,307 A | * | 5/1989 | Watanabe et al. .... | 249/63 |
| 4,889,480 A | * | 12/1989 | Nakamura et al. ... | 425/577 |
| 4,915,609 A | * | 4/1990 | Hahn et al. ........ | 425/384 |
| 5,773,048 A | * | 6/1998 | Ramsey ............ | 425/556 |

(Continued)

FOREIGN PATENT DOCUMENTS

JP   58084740   5/1983

(Continued)

*Primary Examiner*—Yogendra N Gupta
*Assistant Examiner*—Emmanuel S Luk
(74) *Attorney, Agent, or Firm*—Stites & Harbison PLLC; Douglas E. Jackson

(57) ABSTRACT

The present invention relates to plastic injection molding tool, having a front and a rear tool half which, in the closed state, delimit a hollow molding chamber between them. The rear tool half has at least one ejector and at least one oblique slide. The ejector is constituted by at least one front part, designed as a driver, of the rear tool half. It can be displaced to a limited extent by a linear drive mechanism, which is supported on another portion of this tool half or on the base thereof. It is furthermore connected on its rear via a transverse guide element, extending at a defined angle in regard to the movement direction of the linear drive mechanism, with the oblique slide, which is guided by an oblique guide element on a part of the rear tool half which is fastened on the base.

5 Claims, 1 Drawing Sheet

U.S. PATENT DOCUMENTS

| | | | |
|---|---|---|---|
| 5,869,112 A * | 2/1999 | Pierro | 425/589 |
| 5,922,368 A | 7/1999 | Murphy | |
| 6,099,785 A * | 8/2000 | Schweigert et al. | 264/328.1 |
| 7,559,763 B2 * | 7/2009 | Cipkar | 425/577 |
| 2002/0076466 A1 * | 6/2002 | Mowery et al. | 425/556 |
| 2004/0109913 A1 * | 6/2004 | Drees | 425/556 |

FOREIGN PATENT DOCUMENTS

| | | |
|---|---|---|
| JP | 59142110 | 8/1984 |
| JP | 07223244 | 8/1995 |

* cited by examiner

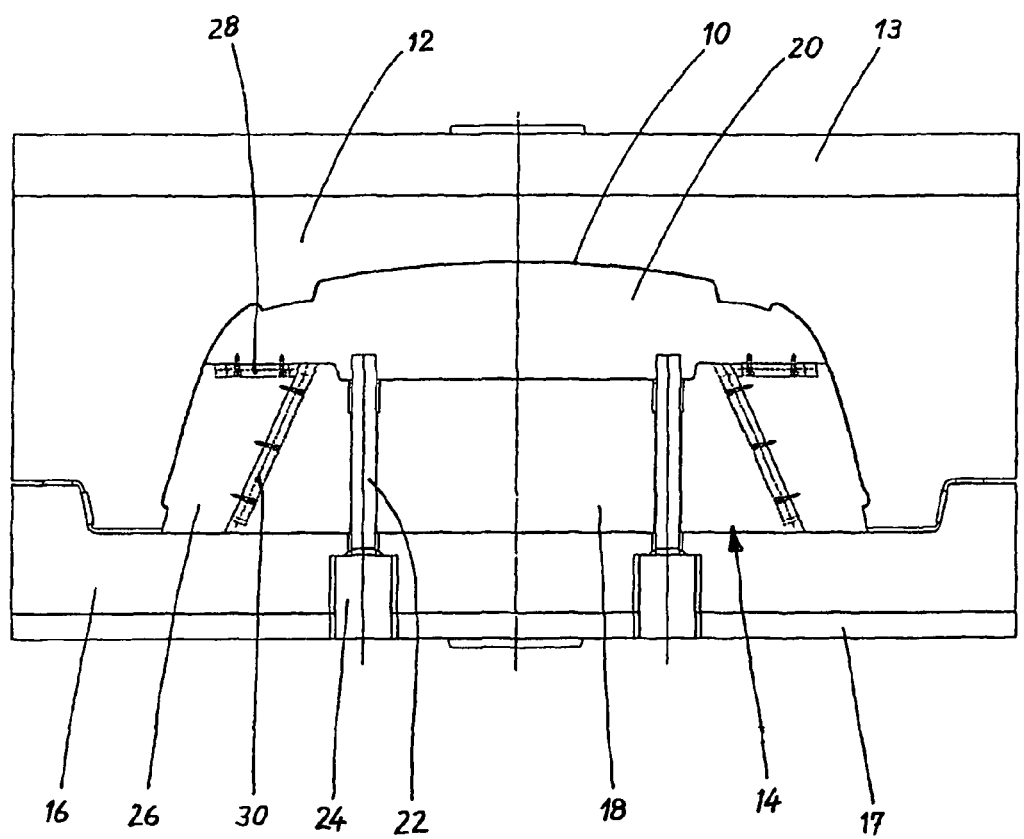

PLASTIC INJECTION MOULD TOOL

FIELD OF THE INVENTION

The invention relates to a plastic injection molding tool, consisting of a front and a rear tool half which, in the closed state, delimit a hollow molding chamber between them, wherein the rear tool half has at least one ejector, which is constituted by its front portion and can be shifted to a limited extent by a linear drive mechanism, and at least one oblique slide, which is guided by means of an oblique guide element.

BACKGROUND OF THE INVENTION

In connection with known plastic injection molding tools for producing hollow or domed workpieces, the rear tool half, customarily called a core, which shapes the inner wall of the workpiece, is customarily fastened on a bridge-like so-called support structure, which in turn is supported on a base or sole plate which is to be connected to a fixing plate of the injection molding machine. The bridge-like support structure is required for providing a space for the movement of an ejector plate located underneath it, which can be moved forward and back over a defined stroke by means of a linear drive mechanism supported on the bridge-like support structure, and is connected with the ejectors and oblique slides by means of push rods. Because the push rods moving the oblique slides are arranged inclined in respect to the feeding direction and are conducted, longitudinally displaceable, through bores correspondingly extending obliquely through the bridge-like support structure, they displace the oblique slides sideways during the forward movement of the ejector plate, so that they can be retracted out of protrusions or undercuts of the lateral wall of the workpiece, so that in the end the latter can be lifted off the core of the mold and ejected. The oblique position of the push rods of the oblique slides requires a relatively large ejector plate and therefore also a comparatively large hollow chamber which must be bridged. Such a conventional injection molding tool is described in U.S. Pat. No. 5,922,368, wherein the center front area of the core overlaps the oblique slides and is used as an ejector.

The known construction of the plastic injection molding tools with an ejector plate, which can be moved underneath a bridge-like support structure and has push rods, has the disadvantage that the manufacture of the tool from a multitude of movable parts is complicated and very expensive, wherein furthermore there is the danger of sagging of the bridge-like support structure and deformation of the relatively long push rods.

OBJECT AND SUMMARY OF THE INVENTION

The invention is therefore based on the object of making available an injection molding tool of the type mentioned at the outset, which can be produced simpler in its entire structure and considerably more cost-effectively.

In accordance with the invention, the above object is attained in that the ejector is designed as a driver, whose rear is connected with the oblique slide by means of a transverse guide element extending at a defined angle in respect to the movement direction of the linear drive mechanism.

The novel injection molding tool offers the advantage that the ejector plate which had been customary up to now, and therefore also the bridge-like support structure, can be omitted. The ejector, together with transverse guide elements on its rear and oblique guide elements attached to a tool part which is fixedly connected with the rear fixing plate, takes over the function of the ejector plate of driving the oblique slides in a direction transversely to the feeding direction of the ejector by means of push rods. Therefore, in the extreme case only a single element of the core must be pushed forward, preferably the center front one, which is to be called the core cap. The oblique slides are taken along by the core cap in the feeding direction via the transverse guide elements, and are displaced in the transverse direction along the transverse guide elements in the course of this axial movement. Except for one or several pistons, or other push rods, which substantially need to extend only through the portion of the core which is fixedly connected with the fixing plate and are guided in appropriate bores in the core, there are no further push rods, in particular none with a complicated movable seating for driving the oblique slides. For example, the transverse guide elements and oblique guide elements of the oblique slides can be designed as T-guidance devices or dovetailed guidance devices and are under tension only transversely in respect to their linear extension and offer large contact faces, so that there will be no danger of an overload and deformation, even at large deformation angles. For this reason, the ejector stroke can be shortened in comparison with the customary concept.

The preferably one-piece ejector in the form of the core cap consists of the entire center front area, or a partial front area of the core, and extends far enough over the oblique slides that these can be connected with it via the transverse guide elements. Fewer separating lines result in the front area of the workpiece interior because of the size and the undivided embodiment of the core cap, so that an improved surface quality of the products made by means of the injection molding tool results. A further improvement in quality results from the omission of the rod connection between the ejector plate and the slides, which had been required up to now, since the linear expansion of the rods could previously lead to markings. Finally, the rear support over its entire surface of the plate supporting the core, which becomes possible because of the omission of the ejector plate, offers the assurance of a rigid, exactly shaped tool because, different from a core mounted on a bridge-like support structure, the danger of sagging is removed with certainty.

No restriction of the function is connected with the change to the newly proposed tool concept in comparison with the customary construction with an ejector plate. On the contrary, because the oblique guide elements formed by rails can have a greater inclination in respect to the feeding direction than the push rods used up to now for moving the oblique slides, it is possible to realize a shortening of the ejector stroke and a reduced cycling time. Finally, the good hold-down function of the core cap should be mentioned which, in the closed position of the molding tool, pushes the oblique slides into their rear, or outer, end position.

The invention will be explained in greater detail in what follows by means of an exemplary embodiment represented in the drawings.

BRIEF DESCRIPTION OF THE DRAWINGS

The single drawing shows a simplified longitudinal section, without cross-hatching, through a plastic injection molding tool for producing a motor vehicle bumper.

DETAILED DESCRIPTION OF THE PREFERRED EMBODIMENT

The tool is represented in the closed state. It is so large that the hollow molding chamber, identified by 10, into which the liquid plastic is injected, only appears as a slightly heavier drawn line. It can be seen that it is in the shape of the profile of a motor vehicle bumper extending from its left to its right end. The hollow molding chamber as a whole is convexly curved toward the front and outward at the sides. Since, as represented, its lateral ends are curved inward, and lateral undercuts are possibly provided, the molding tool must be embodied with slides in order to be able to eject the created workpiece from the molding tool after the injection process.

In a manner known per se, the injection molding tool consists of a front tool half 12 and a rear tool half 14. The front tool half 12, also called a female mold, lends the predetermined shape to the front and outside of the bumper. The front tool half 12 is designed in the customary way and is attached to a base plate 13, which is to be connected with a stationary first fixing plate (not represented) of the injection molding machine. The female mold is normally stationary, since the injection nozzles with feed lines are located on this side of the tool.

The invention relates to the construction of the rear tool half 14, i.e. the core, which provides the inside of the workpiece with its shape. The core 14 is fixedly connected with a core plate 16, and the latter is connected with a base plate 17. Together they constitute a base to be connected with a second fixing plate, also not represented, of the injection molding machine. Therefore the core plate 16 is supported over its entire rear and thus is optimally rigid. For opening and closing the tool, the base 16, 17 with the core 14 is displaced forward and back by the driveable fixing plate of the injection molding machine which supports it. In the represented closed state of the molding tool, the front, cap-shaped portion 20 of the core 14 rests against the front face of a tool element 18, which is connected with the core plate 16, and is axially supported thereon. The core cap 20 is a relatively large part of the injection molding tool. It is used as an ejector, and for this purpose is fixedly connected with the front ends of the piston rods 22 of two hydraulic cylinders 24, which have been integrated into the base 16, 17. The piston rods 22 are guided in a linearly displaceable manner in appropriate bores extending in the feeding direction through the tool element 18.

During the axially forward directed ejection stroke, the core cap 20 axially takes along the two oblique slides 26 shown by way of example, because these are fixedly connected with it via respective transverse guide elements 28, for example T-guidance devices. In place of a T-guidance device 28, a dovetailed or other suitable linear guide device could also be provided. The transverse guide element 28 consists of matching guide rails working together in pairs, for example, respectively one of which is fixedly attached to the rear of the core cap 20, and the other to the front of the oblique slides 26, for example screwed on. It could alternatively be possible to directly work the profiled guide device directly into at least one of the two tool elements 20, 26, for example.

A further guide device is respectively provided between the tool element 18, which is fastened on the core plate 16, and each one of the oblique slides 26. These respectively are straight-line oblique guide elements 30, which are inclined in the feeding direction toward the center of the tool. What has been said in regard to the transverse guide element 28, correspondingly applies to the practical design of the oblique guide element 30.

The injection molding tool shown operates as follows:

After an injection process, the tool is opened in that the rear tool half 14 is pulled away toward the rear—downward in the drawing—. For ejecting the created bumper, the hydraulic cylinders 24 push the core cap 20 forward by means of their piston rods 22, possibly already during the opening of the tool. In the course of this the oblique slides 26 are also taken along via the transverse guide elements 28. During their forward movement, the oblique slides 26 slide along their respective oblique guide elements 30 inwardly closer to the central longitudinal axis of the tool, wherein a movement along the transverse guide elements 28 also takes place. Because of this, the oblique slides 26 are pulled out of the lateral protrusions and undercuts of the shaped workpiece, so that it can be released from the core 14 and ejected.

It is understood that numerous variations and complements of the represented injection molding tool are possible without departing from the claimed basic principle of the tool construction. For example, there is the possibility of employing, instead of the hydraulic cylinders 24, pneumatic cylinders or electrically driven feeding elements, for example with a rotatingly driven threaded spindle respectively working together with a nut held, fixed against relative rotation, on the core cap 20. It would be alternatively possible to embody only the lateral areas of the represented core cap 20 as the ejector, while the central area of the core cap 20 is fixedly connected with the tool element 18. In a further modification, the transverse guide elements do not extend perpendicularly in respect to the movement direction of the ejector, but at an angle deviating upwardly or downwardly from 90°.

Depending on the shape of the workpiece, the concept of the invention furthermore allows, to the extent required or useful, the arrangement of one or several additional ejectors, which for example are also driven by hydraulic cylinders and, in the state wherein the core cap 20 is pushed forward, can be pushed past the front face thereof in order to loosen the shaped workpiece from the relatively large core cap 20. It is of course also possible to take all other steps customary in traditional mold construction, provided they are compatible with the above represented novel concept for driving the oblique slides by means of one or several ejectors 20.

What is claimed is:

1. A plastic injection molding tool, of comprising:
   a front and a rear tool half which, in the closed state, delimit a hollow molding chamber therebetween,
   the rear tool half including
   a) at least one ejector, having a front molding portion
   b) a linear drive mechanism which shifts the at least one ejector to a limited extent along a movement direction,
   c) at least one oblique slide, and
   d) an oblique guide element which guides the at least one oblique slide for a movement oblique to the movement direction,
   wherein the at least one ejector serves as a carrier plate and additionally has
   a) a rear side and
   b) a transverse guide element extending on the rear side at a defined angle in respect to the movement direction of the linear drive mechanism and connecting the rear side of the at least one ejector to the at least one oblique slide, such that movement of the at least one ejector by the linear drive mechanism carries the at least one oblique slide with the at least one ejector and results in a movement of the at least one oblique slide which is guided by both the transverse guide element and the oblique guide element.

2. The plastic injection molding tool in accordance with claim 1, wherein the rear tool half further includes:
   a tool element,
   a core plate supporting the at least one ejector, the at least one oblique slide and, the tool elements, and a base plate on which an entire rear surface of the core plate is seated, and on which the linear drive mechanism is supported directly or indirectly.

3. The plastic injection molding tool in accordance with claim 2, wherein the linear drive mechanism has at least one hydraulic cylinder with a piston and a piston rod, which piston rod is guided in the tool element and connected at a front end thereof with the at least one ejector.

4. The plastic injection molding tool in accordance with claim 1, wherein the transverse guide element extends at right angles in regard to the movement direction of the linear drive mechanism.

5. The plastic injection molding tool in accordance with claim 1, wherein the transverse guide element, and/or the oblique guide element, are T-guidance devices.

* * * * *